US005354168A

United States Patent [19]

Allison et al.

[11] Patent Number: 5,354,168

[45] Date of Patent: Oct. 11, 1994

[54] APPARATUS FOR RESTRAINING AND TRANSPORTING DIES

[75] Inventors: James W. Allison, Monroeville; Timothy L. LaBarre, Pittsburgh, both of Pa.

[73] Assignee: The United States of America as represented by the United States Department of Energy, Washington, D.C.

[21] Appl. No.: 970,883

[22] Filed: Nov. 3, 1992

[51] Int. Cl.[5] .................... B65G 35/00

[52] U.S. Cl. .................... 414/676; 83/560; 100/214; 100/224; 100/918; 414/786

[58] Field of Search .................... 180/125; 269/20, 234; 414/676, 786; 100/214, 224, 918; 72/294, 300, 350, 419, 420; 29/243.53, 243.54; 83/559, 560

[56] References Cited

U.S. PATENT DOCUMENTS

| | | | |
|---|---|---|---|
| 3,457,874 | 7/1969 | Tezuka et al. | 180/125 X |
| 4,506,871 | 3/1985 | Yonezawa | 269/234 X |
| 4,698,894 | 10/1987 | Lingaraju et al. | 100/918 X |
| 4,810,458 | 3/1989 | Oshima et al. | 264/555 |
| 4,828,769 | 5/1989 | Maus et al. | 264/2.2 |
| 4,900,242 | 2/1990 | Maus et al. | 425/149 |
| 4,901,990 | 2/1990 | Frechette | 269/20 X |

FOREIGN PATENT DOCUMENTS

| | | | |
|---|---|---|---|
| 500441 | 8/1992 | European Pat. Off. | 269/20 |
| 52-13278 | 2/1977 | Japan | 414/676 |
| 196525 | 5/1967 | U.S.S.R. | 100/918 |

*Primary Examiner*—Michael S. Huppert
*Assistant Examiner*—Janice Krizek
*Attorney, Agent, or Firm*—Virginia B. Caress; William R. Moser; Robert W. Poteat

[57] ABSTRACT

Apparatus for restraining and transporting dies in punch press operations is provided. A floatation platen for supporting a die on the platen's upper surface has a plurality of recessed gas exhaust ports on the platen's lower surface. A source of pressurized gas delivers gas to a platen manifold, for delivery to orifices located in the gas exhaust ports. The flow of gas is controlled by a first valve adjacent the gas source and a second valve adjacent the manifold, with the second valve being used to control the gas flow during movement of the die. In this fashion, a die may be moved on a cushion of air from one workstation to a selected second workstation. A moveable hydraulically operated restraining fixture is also provided, for clamping the die in position during the compacting phase, and for releasing the die after completion of the compacting phase by releasing the hydraulic pressure on the restraining fixture. When pressure in the hydraulic cylinders on the restraining fixture is reversed, the restraining fixture will retract so that there is no contact between the die and the restraining fixture, thereby allowing the die to be removed from a first workstation and moved to a second selected workstation.

9 Claims, 2 Drawing Sheets

APPARATUS FOR RESTRAINING AND TRANSPORTING DIES

TECHNICAL FIELD

This invention relates to an apparatus for restraining and transporting dies in punch press operations, and more particularly, to an apparatus including a hydraulic restraining fixture and a flotation platen which allow for ease of release and movement of dies from one work station to another, with minimum use of power and mechanical assistance. The unique air flotation platen is designed to operate at a low pressure of 5 to 10 psi, and the hydraulically operated die restraining fixture is designed to hold the die and platen in place during the compacting phase of a punch press operation, and to allow for ease of release of the die and platen after the compacting phase is complete.

BACKGROUND ART

Presently known apparati for restraining and removing dies in a punch press operation utilize a fixed-width restraining fixture and a die carriage which transports the die into and out of the restraining fixture. It also commonly utilizes a series of rack and pinion drive shafts, shear pins, a drive motor clutch, and a carriage, in addition to the restraining fixture necessary to hold the die while compaction takes place. The die will expand under the heavy pressure applied during compaction. However, the restraining fixture restrains the die, leaving it wedged in place when compaction is completed and the upper ram returns to its home position. Removing the die from the restraining fixture is then accomplished by using the die carriage. The lateral forces exerted against the fixed-width restraining fixture are extreme, and it requires high torque to release the die from the restraining fixture and propel it to the next work station. Breakdowns are frequent and often difficult to repair. In addition, the die assemblies weighing as much as 75–85 pounds must be physically pushed and moved from one location to another. These problems are all greatly exacerbated when working with highly toxic materials requiring the use of a glove box to isolate the operator from the workpiece.

U.S. Pat. No. 4,810,458 to Oshima et al. is representative of many patents wherein a floating air cushion or the like is used to support a workpiece. Oshima discloses a ceramic body which is continually extruded through a die of an extruder and is supported by a porous support, in a slightly floating state, by air pressure provided through pores of the support. U.S. Pat. Nos. 4,828,769 and 4,900,242, both to Maus et al, each disclose an apparatus for injection molding of articles, including a movable platen assembly. However, none of the known art solves the problems of restraining the die without binding, and of moving the die without elaborate machinery and heavy force requirements.

It is thus desirable to provide an apparatus which allows for ease of removal of a die after the completion of the compaction phase, while nonetheless still providing firm support for the die during the compaction phase. In addition, it is desirable to provide an apparatus which allows a die to be easily moved with minimal power and mechanical aid from one work station to the next in punch press operations. It is particularly important to provide apparatus allowing for these advantages when working with highly toxic materials requiring the use of a glove box, and where a high degree of automation may be desired.

DISCLOSURE OF THE INVENTION

In accordance with the present invention, a flotation platen is provided for movably supporting a die in a punch press operation including a press and a die, a punch which acts on the die, a restraining fixture for the die, and a platen on which the die is supported. The platen includes a plurality of flotation ports located on its lower surface. Preferably, the ports are counterbored and circular in shape, and have a small orifice near their center through which gas under pressure is exhausted to provide flotation. A source of gas is connected to the platen to provide gas under pressure for flow through a platen manifold, and then out through the exhaust orifices. Argon gas has been found to provide the best results within the expected environment and use of the invention. It has been found that, for circular ports 1.625 inches in diameter and 0.015 inches deep, 10 psi of gas pressure from the gas source will provide enough power to lift dies weighing in excess of 100 pounds. Lower weights may be supported by as little as 5 psi. Advantageously, a gas regulator will be utilized to maintain the psi to the platen at the desired level.

Control of the gas flow may best be accomplished by a series of two valves, one adjacent to the gas source and one adjacent to the platen, with a length of flexible coiled hose between the two valves. Preferably, the valve adjacent to the platen is a "pistol-grip" valve, for ease of manual control. With the foregoing arrangement, gas flow may be directed to the flotation ports to provide lift for removing the platen and the die from a first work station, and for floating it on a cushion of air to a second selected work station. In order to accomplish this movement, precision flat surfaces are required between the work stations.

Additionally, a movable hydraulically operated restraining fixture is provided to hold the die in place during punch pressing operations. The hydraulically operated restraining fixture will clamp the die in place and restrain it during compacting, then release the die completely for moving to the next work station. There will be no friction between the released die and the restraining wall surfaces.

Based on the foregoing, a number of advantages of the present invention are readily apparent. A unique flotation platen is provided which allows a die to be moved quickly and easily from work station to work station without the use of elaborate machinery, and with minimal use of force. This allows the die to be easily moved either manually or by use of simple robotics. This is particularly advantageous when dealing with highly toxic materials where careful handling, minimal force, and automation are all desirable.

In addition, the use of the hydraulically operated restraining fixture allows for ease of set-up of the die and also for removal of the die, again with minimal use of machinery and force. The hydraulically operated restraining fixture is thus also uniquely suited to simplifying die operations, whether they be performed manually or by simple robotic means.

Additional advantages will become readily apparent from the description which follows, together with the accompanying drawings.

BEST MODE FOR CARRYING OUT THE INVENTION

Figure 1:
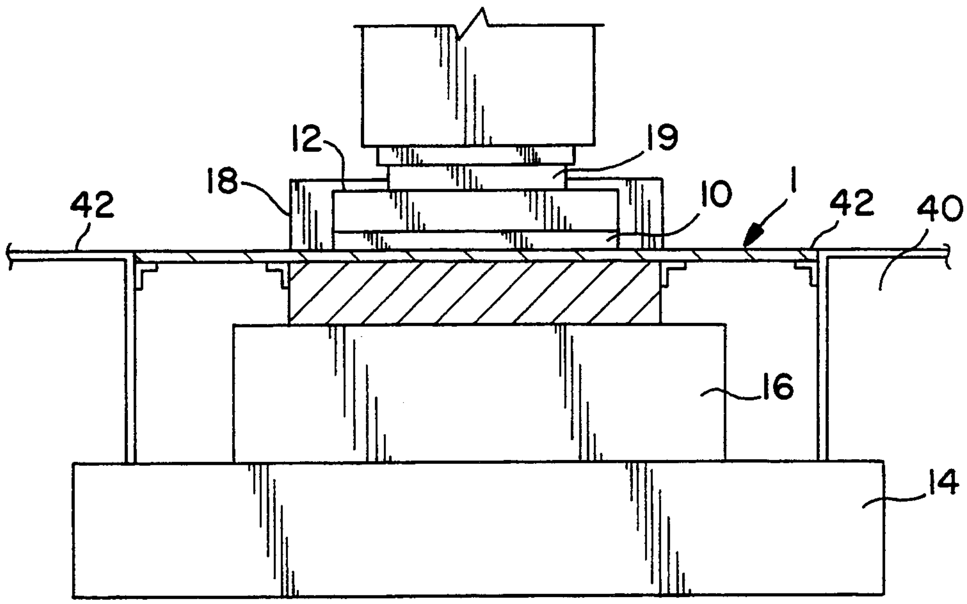
FIG. 1 is a front view of a workstation showing the position of the elements of the present invention.
Figure 2:
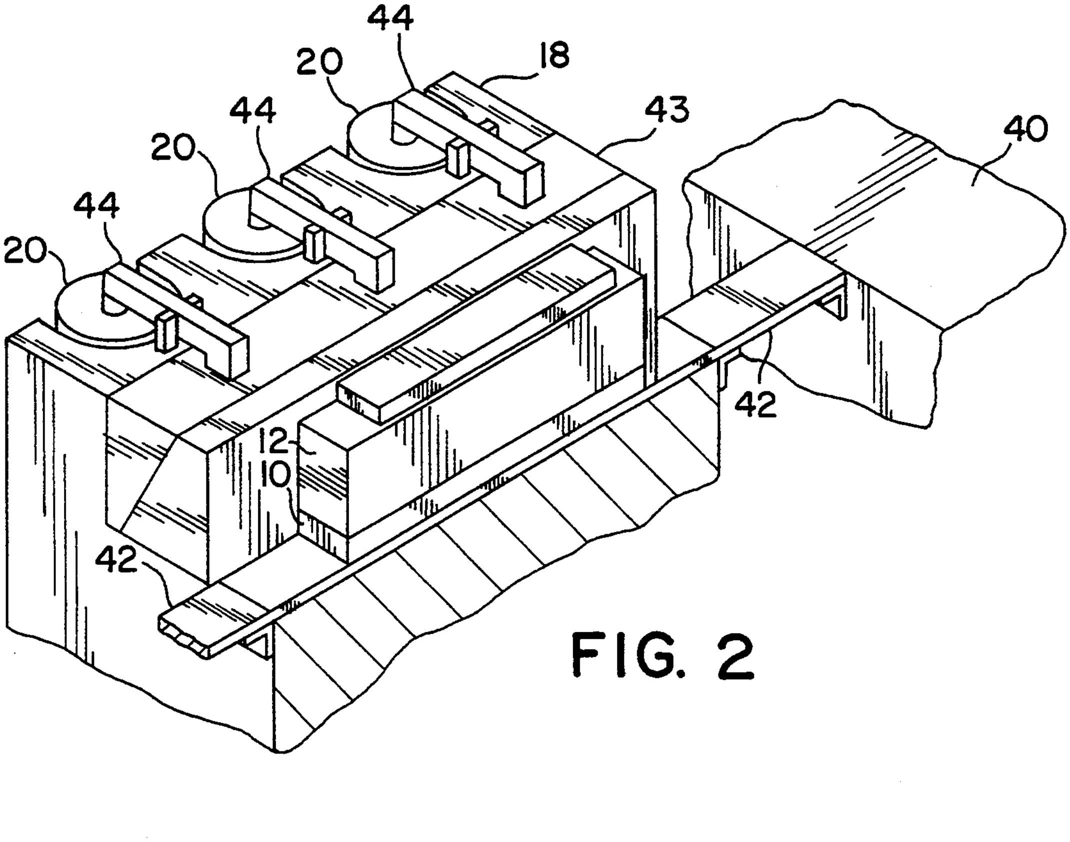
FIG. 2 is a perspective view of the invention showing the position of the hydraulic cylinder.

In accordance with the present invention, as depicted in FIGS. 1 and 2, there is depicted a punch pressing work station 1 utilizing the apparatus of the present invention. A flotation platen 10 is provided for supporting a die 12 during punch pressing operations. Punch pressing operations occur in the well known manner, with press bed 14 and support plate 16 providing a base of support for the operation. During punch pressing operations, the platen 10 rests upon the plate 16 with the die 12 resting on top of the platen 10. The platen 10 and the die 12 are held securely in place during the compacting phase of the operations by restraining fixture 18. During the compaction phase, punch 19 exerts many tons of pressure on the die 12, causing great lateral pressure against the restraining fixtures 18. The restraining fixture 18 is hydraulically operated, with pressure being applied and released through hydraulic cylinders 20. The hydraulic restraining fixture 18 clamps the die 12 in place and restrains it during the compacting phase by forcing the wedge 43 down by the use of lever arms 44 from the hydraulic cylinders 20. The hydraulic cylinders then release the die completely by pulling the wedge 43 up allowing the die to be moved to the next work station. Upon release of the die 12, the hydraulically operated restraining fixture 18 will maintain no contact with the die, and there will thus be minimal friction between the released die and the restraining fixture surfaces. This provides a significant advantage over conventional restraining means which often bind with the die due to the very high pressure applied by the punch, with the result that the die must be mechanically pried lose in order to dislodge it from contact with the restraining fixture.

Figure 3:
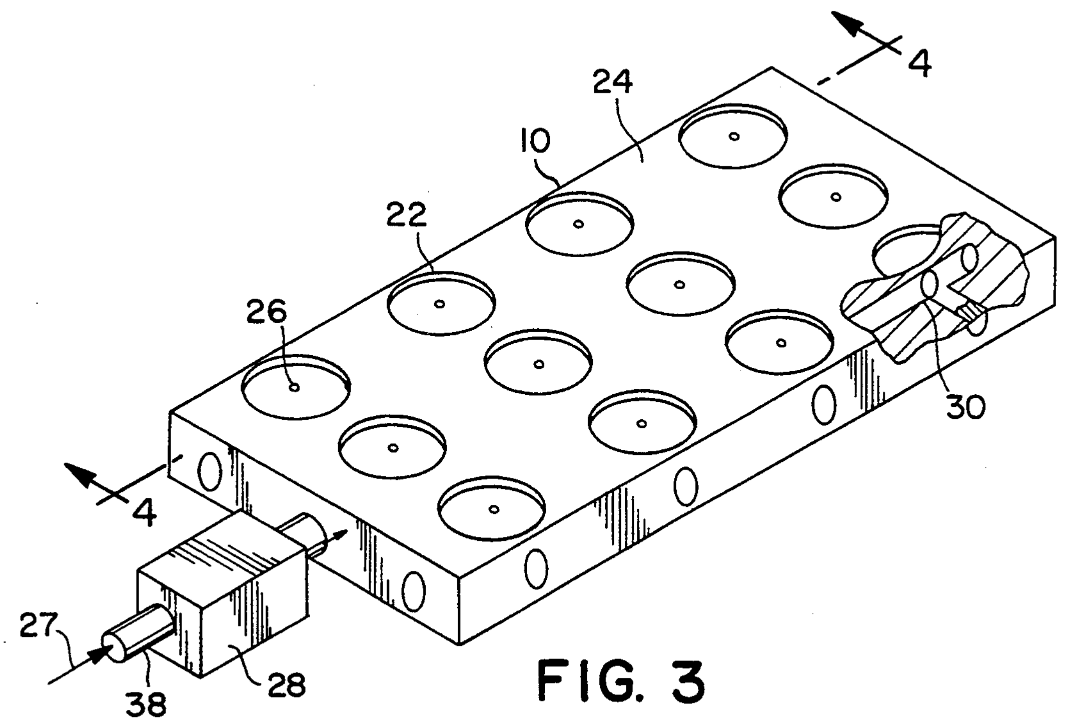
FIG. 3 is a bottom view of the platen showing the exhaust portion of the bottom surface of the platen.
Figure 4:
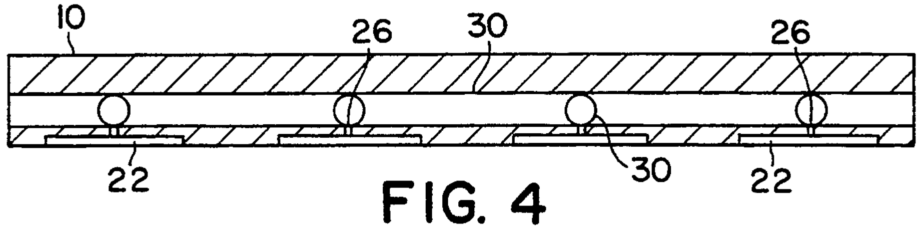
FIG. 4 is a cross-sectional view taken along line 4—4 of FIG. 3, showing the counter-boring of the ports.

Referring now to FIGS. 3 and 4, the platen 10 has plurality of exhaust ports 22 recessed into its lower surface 24. Each exhaust port 22 has a small orifice 26, preferably near the center of the port 22. Gas 27 is supplied through inlet valve 28 and flows through the platen manifold 30, from which it is exhausted through the orifices 26. Advantageously, inlet valve 28 is a "pistol grip" valve, which allows for ease of manual control of the gas flow 27.

In the preferred embodiment, the exhaust ports 22 are circles approximately 1.625 inches in diameter, and are counter-bored to approximately 0.015 inches in depth. With this configuration, incoming gas pressure of 10 psi will provide sufficient lifting power to lift a die weighing over 100 pounds and allow it to be easily moved over flat surfaces. Lower weights may be supported by as little as 5 psi. In addition, tests have confirmed that the flow of gas from under the platen 10 will be so minimal that it will not cause powders to become airborne.

Figure 5:
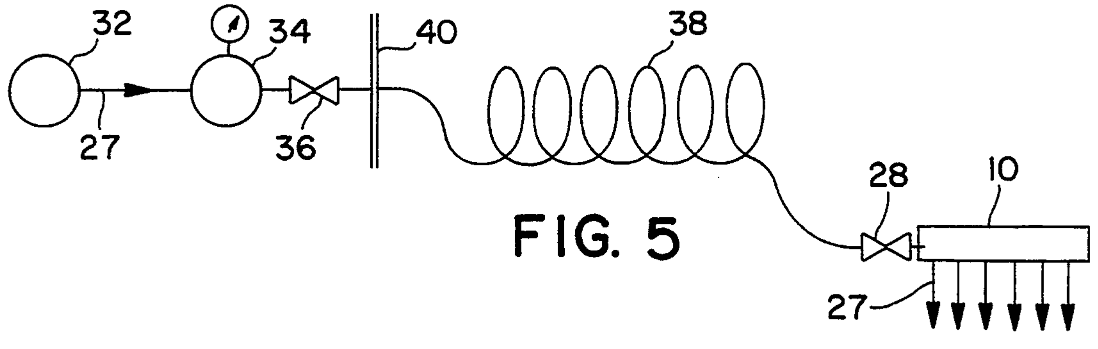
FIG. 5 is a schematic representation of the gas flow through the apparatus.

Referring now to FIG. 5, a schematic representation of the gas flow 27 from the source and through the system is depicted. Gas 27 is supplied from a source 32, and is passed through a regulator 34 which reduces the line pressure to approximately 10 psi. For the purposes of this invention, Argon gas has been found to provide the best results. An initial shut-off valve 36 is provided for on-off control of the gas flow 27 into the glove box 40. Gas flows through gas hose 38 which is preferably a highly flexible coiled hose. Gas flow 27 into the platen manifold 30 is best controlled by a pistol-grip inlet valve 28, which will allow precise manual control of the lift pressure exerted through the exhaust ports 22 and provides a handle for guiding the platen 10. A glove box 40 is depicted, for use with highly toxic materials. In addition, a bridge 42 is provided for moving the die 12 from one work station to another.

In operation, the die 12 is first clamped into place at the work station 1 by the restraining fixture 18 under pressure from the hydraulic cylinder 20. On completion of punch-press operations at the work station 1, pressure on the hydraulic cylinder 20 is reversed, drawing the restraining fixture 18 away from the die 12, for ease of removal of the die 12. Shut-off valve 36 is then turned to the "on" position, and the die 12 may then be easily lifted by operating the pistol-grip inlet valve 28. By squeezing the pistol-grip valve 28, an operator may then lift the die and move it away from the work station 1, across the bridge 42, and on to the next work station.

Based on the foregoing description, a number of worthwhile advantages of the present invention are readily apparent. An apparatus is provided which allows for securely clamping the die in place during compacting operations, yet allows a die to be easily removed without use of machinery or a great deal of force. The die may be easily removed from one work station and moved manually to the next work station, again with use of minimal force and without use of complicated machinery.

This invention has been described in detail in reference to a particular embodiment thereof, but it will be understood that various other modifications can be effected within the spirit and scope of this invention.

What is claimed is:

1. In a punch press combination including a press, a die, a punch for applying pressure to said die, a platen having an upper surface adjacent said die and a lower surface resting on a support plate, a plurality of work stations, and restraining means for holding said die in place on said platen during a compacting process, the improvement comprising:

a plurality of flotation ports located on the lower surface of said platen;

a source of gas in communication with said flotation ports for providing a flow of gas through said ports to allow said die to be moved from one work station to another on a cushion of gas; and wherein said restraining means is hydraulically driven to provide firm lateral support for said die on said platen when hydraulic pressure is applied to said restraining means during a compacting process of the press, and said restraining means is movable to allow easy release of said die on said support plate when hydraulic pressure on said restraining means is reversed.

2. The apparatus as claimed in claim 1, wherein each of said ports is evenly counter-bored to an outer perimeter, and has at least one orifice within said perimeter for exhausting gas into said counter-bored port.

3. The apparatus as claimed in claim 1, further including valve means for manually controlling flow of said gas from said gas source through said ports.

4. The apparatus as claimed in claim 3, wherein said valve means includes:

a first valve adjacent to said gas source;

a second valve adjacent to said platen; and a flexible coiled hose between said first and second valves for supplying gas to said platen and while allowing movement of said platen.

5. The apparatus as claimed in claim 1, wherein said gas is Argon gas.

6. The apparatus as claimed in claim 1, wherein said source of gas is at a pressure of 5 to 10 psi.

7. A method for moving a die from one work station in a punch press combination to another work station, the punch press combination including a press, said die, a punch for applying pressure to said die, a platen having an upper surface adjacent said die and a lower surface resting on a support plate, and having a plurality of flotation ports in communication with a source of gas, and hydraulically driven restraining means for holding said die in place on said platen during a compacting process, comprising the steps of:

providing a flow of gas through said ports to move said die from one work station to another work station on a cushion of gas;

applying hydraulic pressure to said restraining means to hold said die laterally in place on said platen during a compacting process of said press; and, releasing hydraulic pressure on said restraining means in order to allow easy release of said die for movement on said support plate.

8. The method of claim 7, wherein said flow of gas provided is Argon gas.

9. The method of claim 7, wherein said flow of gas is provided to said platen at a pressure of 5 to 10 psi.

* * * * *